Sept. 6, 1949.                    M. C. FUQUA                  2,481,211
        AZEOTROPIC DISTILLATION OF AQUEOUS ISOPROPANOL
                        CONTAMINATED BY ACETONE
                          Filed May 22, 1946
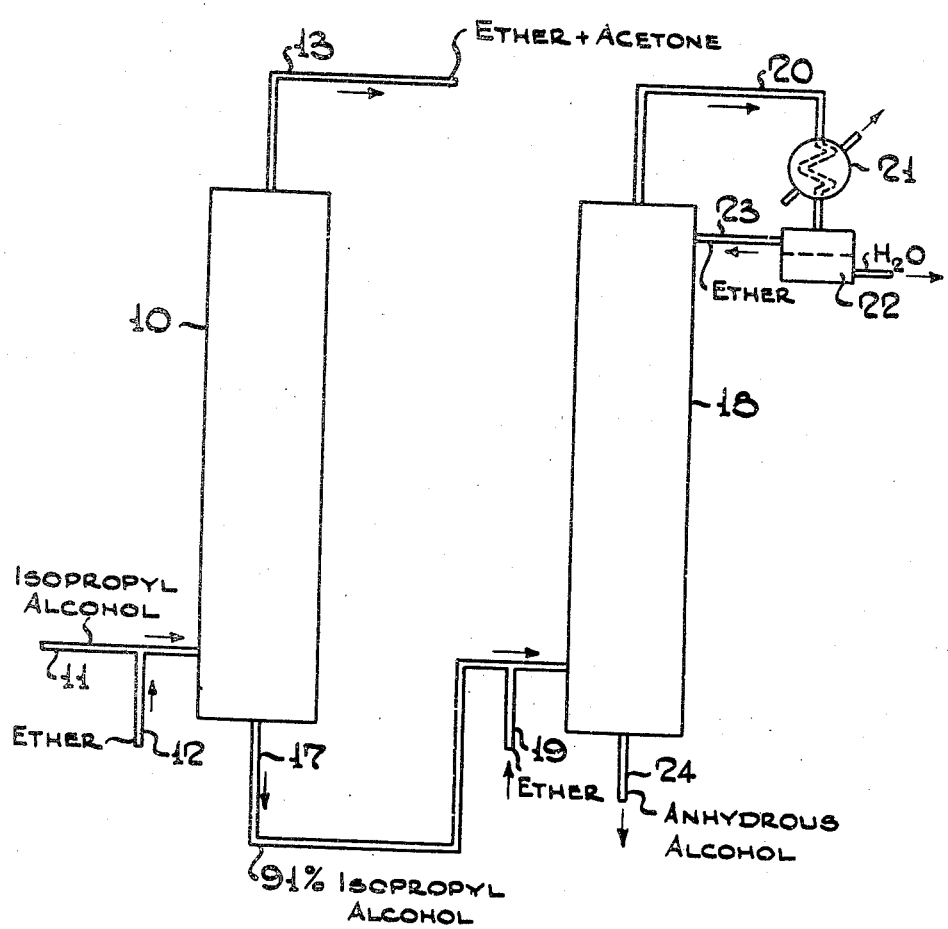
Mack C. Fuqua  Inventor
By  J C Small  Attorney Patented Sept. 6, 1949

2,481,211

UNITED STATES PATENT OFFICE 2,481,211

AZEOTROPIC DISTILLATION OF AQUEOUS ISOPROPANOL CONTAMINATED BY ACETONE

Mack C. Fuqua, Baton Rouge, La., assignor to Standard Oil Development Company, a corporation of Delaware Application May 22, 1946, Serial No. 671,581

6 Claims. (Cl. 202—42)

This invention relates to an improvement in the art of distillation and more particularly relates to the purification of organic liquids by distillation.

It is well known that in the preparation of many aqueous organic oxy compounds, such as ethyl alcohol, isopropyl alcohol, secondary butyl alcohol and the like, a crude product is obtained which must be purified. This purification is most usually accomplished by distillation. Such purified products may be marked either as a concentrated solution in water or as the anhydrous product. The purification of these products by distillation often presents a difficult problem. For example, crude isopropyl alcohol prepared by absorbing propylene in sulfuric acid often contains acetone as an impurity, particularly if the propylene feed gas used contains acetylenes. The removal of acetone from the crude aqueous isopropyl alcohol is difficult. When aqueous isopropyl alcohol containing alcohol is distilled, acetone appears in the product because of the abnormal behavior of the acetone. If the anhydrous product is desired, simple distillation does not result in the recovery of anhydrous alcohol, owing to the formation of a constant boiling binary mixture of the compound with water. Accordingly, it has been found necessary to add an entraining agent which forms a ternary constant boiling mixture with the compound to be dehydrated and the water. This ternary mixture is distilled off and allowed to separate into two layers upon condensation. The aqueous phase is discarded and the entrainer is returned to the still. Suitable entrainers used in the art include hydrocarbons, ethers, carbon tetrachloride, etc. If impurities are present, the difficulties are often increased.

For example, it is known to dehydrate isopropyl alcohol with isopropyl ether as the entrainer. However, since isopropyl alcohol often contains acetone as an impurity, particularly when prepared by absorbing propylene in sulfuric acid, the removal of water is adversely affected by changes in the composition and volumes of the two liquid phases formed by condensation of the overhead from the azeotropic distillation. Since acetone is soluble in water and in isopropyl ether, this effect is particularly disadvantageous when using isopropyl ether as the entraining liquid because the presence of acetone tends to put water into solution in the non-aqueous phase with a consequent decrease in the volume of the aqueous layer. In fact, the presence of acetone as a contaminant often prohibits the use of isopropyl ether as the entrainer in the azeotropic distillation of isopropyl alcohol.

The significance of acetone as a contaminant can be appreciated by a comparison of the following data.

TABLE I

*Composition of ternary azeotrope of isopropyl ether-isopropyl alcohol-water*

Distilled at 760 mm. Hg. Phases separated at 25° C.

|  | Upper Layer | Lower Layer | Combined |
|---|---|---|---|
| Weight percent Isopropyl Alcohol | 7.2 | 9.8 | 7.3 |
| Weight percent Isopropyl Ether | 91.7 | Trace | 88.0 |
| Weight percent Water | 1.1 | 90.2 | 4.7 |
| Weight percent Layer | 96.0 | 4.0 | 100.0 |
| Boiling Point, ° C | | | 61.6 |

From the above discussion, it can be seen that the small amount of the water phase formed when no acetone is present will be considerably affected in the presence of acetone because of the decrease in volume of the water phase. When there is an appreciable quantity of acetone in the feed, the acetone content of the overhead will build up substantially, requiring a large quantity of heat, excessive distillation and condensation equipment.

What has been said above in regard to the effect of acetone as a contaminant in the dehydration of isopropyl alcohol is just as applicable to the distillation of any other organic oxy compounds containing a contaminant which interferes with the separation of phases in the distillation.

It is, therefore, the main object of this invention to provide a process for the distillation of organic oxy compounds in which the effects of contaminating substances is minimized or completely overcome.

It is a further object of this invention to provide a process for the removal of contaminating substances from the aqueous solution of an organic oxy compound to be dehydrated by azeotropic distillation prior to the dehydration step.

It has now been found that these and other objects of this invention can be accomplished by subjecting the compound to be distilled to azeotropic distillation to remove the contaminating material and if an anhydrous product is desired then subjecting the purified aqueous solution to the usual azeotropic distillation for purposes of dehydration. It has been further found that such a process is particularly effective in removing acetone as a contaminant in the distillation of isopropyl alcohol using isopropyl ether as the entraining agent. According to this embodiment of the process, aqueous isopropyl alcohol is distilled in the presence of a small amount of isopropyl ether sufficient to completely remove acetone overhead as a ternary azetrope with water. The overhead product containing the ether and acetone is discarded. Aqueous alcohol, free from acetone, is removed from the bottom of the still and if anhydrous isopropyl alcohol is desired, the aqueous product is subjected to a second azeotropic distillation with sufficient isopropyl ether to effect removal of all the water.

In order that the invention may be fully understood, reference is made to the attached drawing as one method of carrying out the process of the present invention.

A binary azeotrope of isopropyl alcohol and water in the ratio of 91:9 volume per cent and containing 0.46 per cent by weight of acetone is introduced into distillation tower 10 through line 11. About 0.1 per cent by weight isopropyl ether, based on the alcohol and water, is initially added through line 12 and subsequently is used to insure the formation of the ternary azeotrope with water and acetone. This ternary azeotrope is removed as vapor overhead through line 13 and discarded. Substantially 91% alcohol free from acetone is removed from the bottom of tower 10 through line 17. This product is suitable for marketing as such but if it is desired to produce the anhydrous product, it is passed to dehydration tower 18 and mixed with about ten volume per cent of isopropyl ether based on the aqueous alcohol initially introduced through line 19. Additional amounts may be added as needed to insure the formation of a ternary azeotrope of isopropyl alcohol, water and ether. Vapors of the ternary azeotrope are removed overhead through line 20, cooled in condenser 21 and collected in decanter 22 where the separation of phases results. The upper non-aqueous phase containing the isopropyl ether is returned to tower 18 through line 23, while the lower aqueous phase is discarded. Anhydrous alcohol is removed from the bottom of tower 18 through line 24.

The following table illustrates the advantages of small amounts of isopropyl ether in removing acetone from aqueous isopropyl alcohol solutions.

TABLE II

| Overhead, Volume, Per Cent | A | | B | |
|---|---|---|---|---|
| | Acetone in O. H. Weight, Per Cent | Acetone in Bottoms, Weight, Per Cent | Acetone in O. H. Weight, Per Cent | Acetone in Bottoms, Weight, Per Cent |
| 2 | 9.6 | 0.33 | 10.0 | 0.16 |
| 4 | 5.4 | 0.23 | 3.4 | 0.09 |
| 6 | 1.8 | 0.12 | 1.9 | 0.07 |
| 8 | 1.4 | 0.07 | 0.9 | 0.04 |
| 10 | 0.6 | 0.05 | 0.8 | 0.02 |
| 12 | 0.4 | 0.04 | 0.2 | 0.00 |
| 14 | 0.2 | 0.02 | 0.1 | 0.00 |
| 16 | 0.1 | 0.00 | 0.07 | 0.00 |
| 18 | 0.07 | 0.00 | 0.05 | 0.00 |
| 20 | 0.02 | 0.00 | 0.02 | 0.00 |

A—91 volume per cent isopropanol contained 0.46 weight per cent acetone.
B—91 volume per cent isopropanol contained 0.46 weight percent acetone plus 0.1 weight per cent isopropyl ether.

While the above process has been described in connection with the distillation of isopropyl alcohol with isopropyl ether it is not intended to be so limited. The process of the present invention is intended to cover the removal of contaminating materials present in small amounts in an organic liquid being distilled and is particularly adapted to the removal of such contaminating materials from organic oxy compounds when ethers are used as the dehydrating agent as described in U. S. 2,140,694 issued December 20, 1938 to Theodore Evans. For example, dinormal propyl ether, dinormal butyl ether, di-isobutyl ether, disecondary butyl ether, ditertiary butyl ether, symmetrical normal, iso, secondary and tertiary amyl, hexyl, heptyl, octyl and the like ethers may be employed as entraining agent in each step depending upon the particular compound being distilled.

The nature and objects of the present invention having been thus fully set forth and specific examples of the same given, what is claimed as new and useful and desired to be secured by Letters Patent is:

1. In a process for the separation of water from aqueous isopropyl alcohol by azeotropic distillation with an entraining agent wherein the distillate separates into two phases and wherein the aqueous alcohol contains acetone which interferes with the separation into phases, the improvement which comprises removing the acetone from the aqueous alcohol by a preliminary distillation in the presence of a small amount of isopropyl ether sufficient only to remove the acetone as an azeotrope.

2. Process for removing acetone from aqueous isopropyl alcohol solutions containing approximately 0.46 wt. % acetone comprising subjecting the aqueous isopropyl alcohol containing the acetone to an azeotropic distillation with 0.1% by weight of isopropyl ether.

3. A process for the removal of acetone from an aqueous solution of isopropyl alcohol containing approximately 0.46 wt. % acetone which comprises mixing the aqueous isopropyl alcohol and acetone with 0.1% by weight of isopropyl ether based on the aqueous alcohol, distilling the mixture to drive off an azeotrope comprising ether, water and acetone, discarding the vapors of the azeotrope and continuing the distillation until acetone is no longer removed overhead.

4. A process according to claim 1 in which the aqueous isopropyl alcohol contains approximately 0.46 wt. % acetone, in which the isopropyl ether entrainer is used in amounts of 0.1 wt. % in the acetone removal step, and in amounts of 10 volume % in the dehydration step.

5. In a process of purifying isopropyl alcohol contaminated by a small amount of acetone in aqueous solution thereof, the improvement which comprises subjecting the contaminated aqueous solution of isopropyl alcohol to distillation in a fractional distillation zone with a small amount of admixed isopropyl ether, removing overhead from said zone an azeotropic vapor mixture of acetone with said ether, and withdrawing isopropyl alcohol free of acetone as bottoms from said fractional distillation zone.

6. A process for the purification and dehydration of isopropyl alcohol contaminated by a small amount of acetone in aqueous solution thereof, which comprises subjecting the contaminated aqueous solution of isopropyl alcohol to distillation in a first fractional distillation zone with a small amount of admixed isopropyl ether, removing overhead from said first fractional distillation zone an azeotropic vapor mixture of acetone with said ether, withdrawing aqueous alcohol free of acetone as bottoms from said fractional distillation zone, passing said aqueous alcohol into a second fractional distillation zone, admixing therewith about 10 volume % of isopropyl ether based on the aqueous alcohol, removing overhead from said second fractional distillation zone an azeotrope comprising isopropyl ether, alcohol and water, condensing the vapors of the azeotrope, separating the aqueous phase from the ether phase, returning the ether phase to the second distillation zone and removing substantially dehydrated alcohol from the bottom of said second fractional distillation zone.

MACK C. FUQUA.

REFERENCES CITED

The following references are of record in the file of this patent:

UNITED STATES PATENTS

| Number | Name | Date |
|---|---|---|
| 1,702,495 | Clapp | Feb. 19, 1929 |
| 2,140,694 | Evans | Dec. 20, 1938 |

OTHER REFERENCES

Analytical Chemistry, August 1947, copy in Scientific Library, page 537.